United States Patent [19]
Fukano et al.

[11] Patent Number: 5,506,595
[45] Date of Patent: Apr. 9, 1996

[54] VEHICULAR DISPLAY SYSTEM FORMING DISPLAY IMAGE ON FRONT WINDSHIELD

[75] Inventors: Junichi Fukano, Yokohama; Hiroshi Endoh, Yokosuka; Shigeru Okabayashi, Yokohama, all of Japan

[73] Assignee: Nissan Motor Co., Ltd., Yokohama, Japan

[21] Appl. No.: 98,601

[22] Filed: Nov. 19, 1992

Related U.S. Application Data

[63] Continuation of Ser. No. 670,511, Mar. 18, 1991, abandoned, which is a continuation of Ser. No. 203,594, Jun. 8, 1988, abandoned, which is a continuation of Ser. No. 829,220, Feb. 14, 1986, abandoned.

[30] Foreign Application Priority Data

Feb. 18, 1985 [JP] Japan ................................ 60-28457

[51] Int. Cl.⁶ .................................................. G09G 5/00
[52] U.S. Cl. ................................ 345/7; 359/13; 359/630
[58] Field of Search ............................ 345/7, 8; 359/13, 359/630, 634; 353/11–14; 307/105; 318/466, 467, 568, 567; 364/424

[56] References Cited

U.S. PATENT DOCUMENTS

| | | | |
|---|---|---|---|
| 2,579,806 | 12/1951 | Dvorkin | 353/14 |
| 2,641,159 | 6/1953 | Mihalakis | 353/14 |
| 2,960,906 | 12/1960 | Fogel | 350/174 |
| 3,603,929 | 9/1971 | Drysdale | 340/97 |
| 3,715,721 | 2/1973 | Irving et al. | 353/13 |
| 3,848,974 | 11/1974 | Hosking et al. | 353/14 |
| 3,866,199 | 2/1975 | Eberhard et al. | 340/705 |
| 3,887,273 | 6/1975 | Griffiths | 353/14 |
| 4,267,494 | 5/1981 | Matsuaka et al. | 318/568 |
| 4,451,887 | 5/1984 | Harada et al. | 318/466 |
| 4,560,233 | 12/1985 | Banbury | 345/7 |
| 4,635,033 | 1/1987 | Inukai et al. | 345/7 |
| 4,647,142 | 3/1987 | Boot | 345/7 |
| 4,711,544 | 12/1987 | Iino et al. | 345/7 |
| 4,811,226 | 3/1989 | Shinohara | 364/424.05 |
| 4,886,328 | 12/1989 | Iino et al. | 345/7 |

FOREIGN PATENT DOCUMENTS 3328226  2/1985  Germany .................. 340/705

*Primary Examiner*—Ulysses Weldon
*Assistant Examiner*—Amare Mengistu
*Attorney, Agent, or Firm*—Foley & Lardner

[57] ABSTRACT

A vehicular display system can project optical images onto different areas on a front windshield in accordance with the effective height of a driver's eyes. The display system includes an image source and a mirror, either of which can be tilted manually and/or automatically. The mirror reflecting an image from the image source onto the inside of the windshield at an angle suitable for reflection toward the driver's eyes and at a height on the windshield fully within the driver's field of view. An electrically controlled seat can provide seat position and inclination signals for use in automatically adjusting the display height. In addition, a memory may hold manually entered display-height information to expedite readjustment of the display height in cases where more than one driver uses the vehicle.

23 Claims, 4 Drawing Sheets

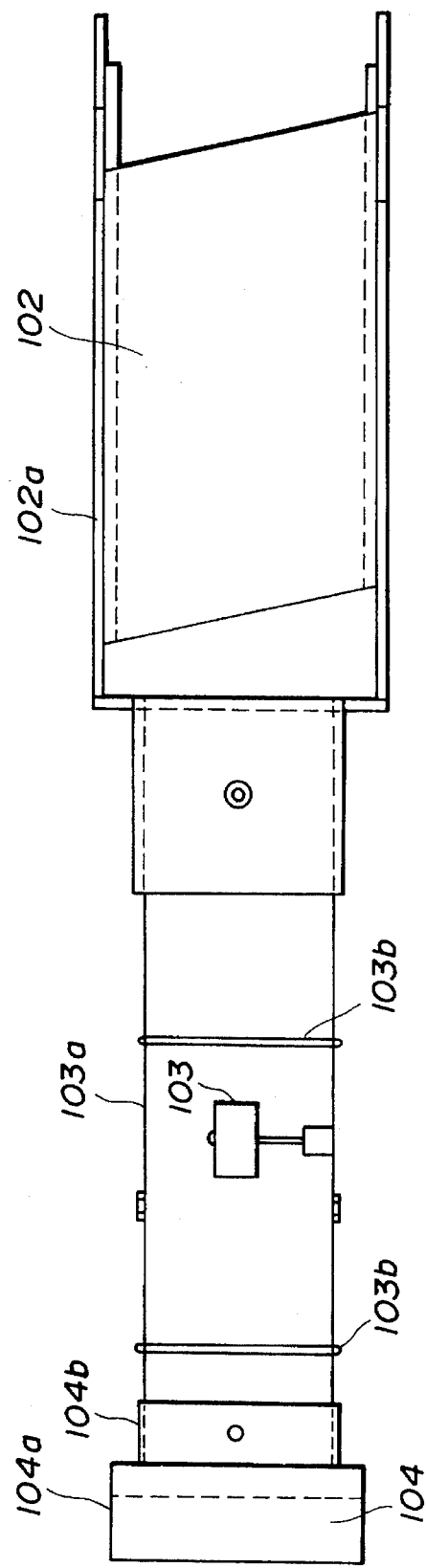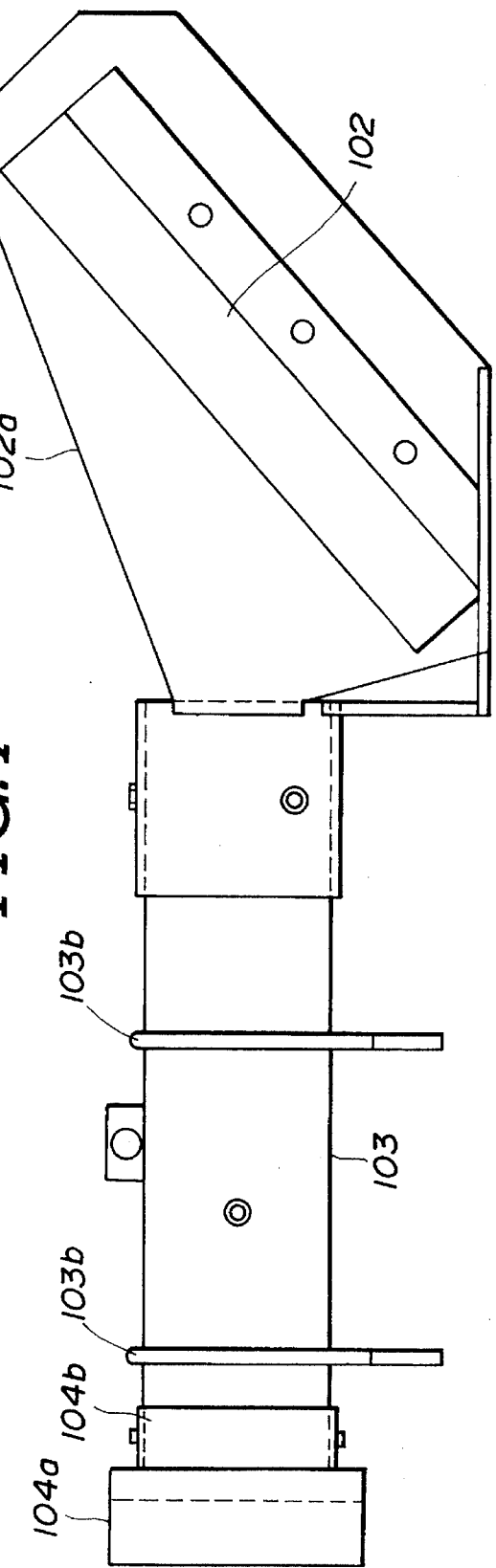

VEHICULAR DISPLAY SYSTEM FORMING DISPLAY IMAGE ON FRONT WINDSHIELD

This application is a continuation of application Ser. No. 07/670,511, filed on Mar. 18, 1991, which is a continuation of Ser. No. 07/203,594, filed on Jun. 8, 1988, which is a continuation of Ser. No. 06/892,220, filed on Feb. 14, 1986 now abandoned.

BACKGROUND OF THE INVENTION

The present invention relates generally to a display system for a vehicle, which displays an information image on or adjacent a front windshield, so that a vehicle driver can see necessary information without looking down to the ordinary instrument panel display. More specifically, the invention relates to a vehicular display system which utilizes the front windshield as a display screen and which selects a suitable section of the front windshield onto which to project display images.

Usually, vehicular speedometers, odometers, trip meters, fuel gauges, clocks and other necessary indicators for vehicle driving are mounted on an instrument panel located beneath the front windshield. When a vehicle driver is watching in front of the vehicle while driving, at least some of the indicators on the instrument panel lie outside of the driver's field of view. This requires that the driver look down at the instrument panel to see the indicators in order to obtain necessary driving information. This conventional arrangement thus requires extra effort on the part of the driver and tends to fatigue the vehicle driver's eyes. Additionally and more importantly, this conventional arrangement prevents the driver from seeing the indicators under certain vehicle running conditions under which intense observation of the forward field is required.

To ameliorate this problem, a so-called "heads-up" type vehicular display system has been proposed which forms images of necessary indicators on a predetermined section on the front windshield. However, conventional heads-up type display systems have not been at all successful since it has been difficult to move the display on the windshield to differing eye points according to the drivers' sitting positions and heights.

Conventionally proposed heads-up type display systems employ a lens and a reflector to form images on the front windshield. Since the front end of the vehicle compartment is very crowded with various accessories such as air conditioning, audio and so forth, the space available in the instrument panel for the display system is severely limited. As will be appreciated, the size of the display images on the windshield is determined by the dimensions of the lens and the reflector. Therefore, although a relatively small lens and reflector could be accommodated within the instrument panel, the size of the image would not suit all drivers, who tend to have varying eye elevations and postures, referred to hereafter as "eye points".

On the other hand, it has been found that if an appropriate section of the front windshield can be selected for each specific eye point, a clear display image can be achieved even if the image is not as large. Therefore, properly selecting the display section of the front windshield according to eye points, a clear and adequate display of the vehicle driving information can be provided on the front windshield.

SUMMARY OF THE INVENTION

Therefore, it is an object of the present invention to provide a vehicular display system which displays necessary vehicle driving information and so forth on the windshield and which can provide a satisfactorily clear and adequate image for various drivers having various eye points.

Another object of the present invention is to provide a vehicular heads-up type display system which allows adjustment of the display about the windshield so that each driver can observe all of the information displayed on the front windshield which is affected by variation among eye points.

A further object of the present invention is to provide a heads-up type vehicular display system which is compact enough to be installed within an instrument panel.

In order to accomplish the aforementioned and other objects, a display system for a vehicle, according to the present invention, includes means for selecting a section on a front windshield onto which a display image is to be formed. The display system also includes a manually operable means associated with the display section selecting means for operating the latter to select a desired section for displaying information, such as driving information.

The driving information to be displayed by the display system according to the present invention may come from a speedometer, a tachometer, a fuel guage, a trip meter and other necessary vehicle measuring instruments. A distance monitor which indicates the distance to a preceding vehicle, and/or failure or OK monitors for various vehicular equipment can be displayed on the front windshield as additional driving information.

In a preferred option, a memory means will be provided in the display system of the present invention, which memory means stores data specifying the selected display section of the front windshield with respect to each of various drivers. In the preferred system, the display section selecting means is so associated with the memory means as to automatically select the display section in response to input identifying one of the pre-selected display sections.

BRIEF DESCRIPTION OF THE DRAWINGS

In the drawings:

FIG. 6 is a partially sectioned plan view of the third and preferred embodiment of a heads-up type automotive display system of the invention; and FIG. 7 is a partially sectioned side elevation of the display system of FIG. 6;

DESCRIPTION OF THE PREFERRED EMBODIMENTS

Figure 1:
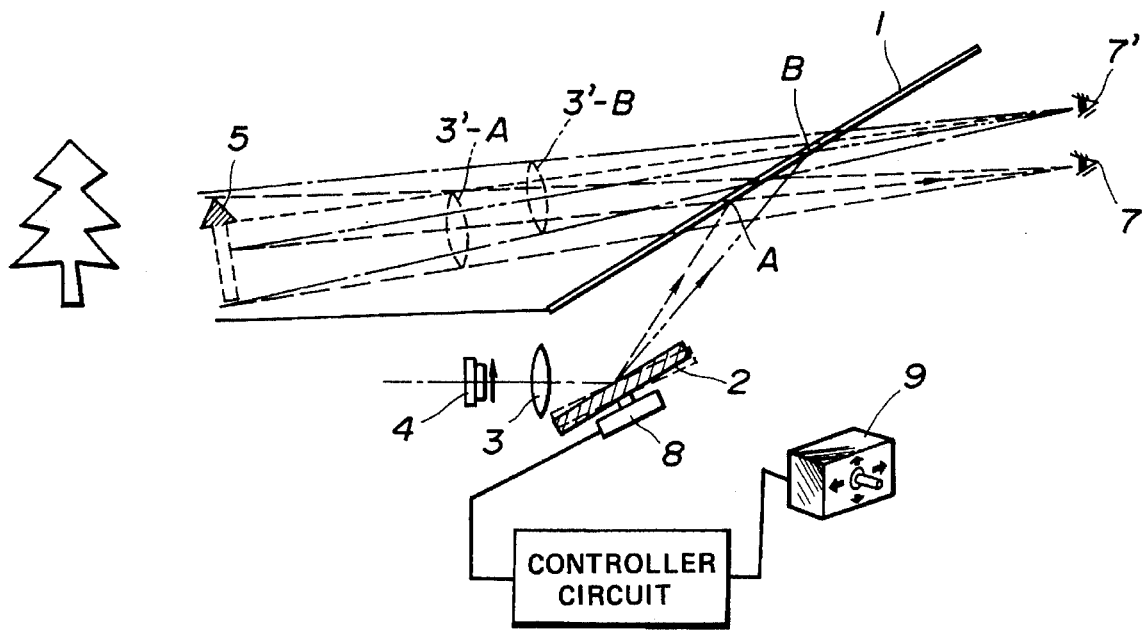
FIG. 1 is a fragmentary illustration showing the first embodiment of a heads-up type display system in accordance with the present invention.

Referring now to the drawings, particularly to FIG. 1, the first embodiment of a heads-up type display system, according to the present invention, utilizes a front windshield 1 as a display screen onto which display images are projected. As set forth above, the information to be displayed on the front windshield 1 may be vehicle driving information such as vehicle speed, engine speed, fuel supply, distance travelled, the distance to a preceding vehicle and so forth.

The heads-up display system includes a total reflection mirror 2 serving as a deflector means for deflecting light forming the image toward the front windshield 1. The total reflection mirror 2 opposes an expansion lens 3 which, in turn, opposes an image source 4, such as a liquid crystal panel, a luminous tube assembly or the like. The expansion lens 3 is adapted to enlarge the image from the image source 4 and pass it to the total reflection mirror 2. The total reflection mirror 2 deflects the light forming the enlarged image toward the front windshield 1.

The deflected image is focused on a virtual focal plane 5 outside of the front windshield. The image formed at the position 5 overlaps with the view of the road as seen by the driver.

The total reflection mirror 2 is associated with a deflection angle adjusting mechanism including a mirror drive motor 8. The mirror drive motor 8 is connected to a controller circuit 10 which controls the motor's drive direction and magnitude for positioning the total reflection mirror 2 at a desired angular position. The controller circuit 10 is, in turn, connected to a manually operable image position selector switch 9. The image position selector switch 9 may comprise a proportioning switch which continuously outputs a signal indicative of the direction in which to move the mirror as long as it is manually operated. The controller circuit 10 outputs a mirror motor control signal ordering continuous activation of the mirror motor 8 in a direction designated by the input signal.

Thus, the driver may manually control the mirror drive motor 8 so as to adjust the mirror angle until the displayed image can be clearly seen.

Assuming the driver's eye point lies at the point 7, the driver's field of view expands as illustrated by the broken lines in FIG. 1. At this time, the mirror angle is to be adjusted at the position illustrated by the solid lines in FIG. 1. This moves the virtual lens position to the point 3'-A. At this mirror angle position, the axis of the image containing light reflects from the point A on the windshield 1 toward the driver's eye 7.

At this mirror position, assume a driver with a higher eye point 7' than the former driver (eye point 7) then occupies the driver's seat. The driver's field of view changes as illustrated by the phantom lines in FIG. 1. At this eye point 7', since the image is focused on the plane 5 through the virtual lens 3'-A, the lower section of the image will lie outside of the driver's field of view at the eye point 7' due to the fact that the driver's eye point 7' is offset from the axis of the image-forming light beam reflected from the point A on the front windshield 1.

In this case, the angle of the total reflection mirror 2 can be manually adjusted by means of the manually operable image position selector switch 9. The point of reflection of the image beam from the front windshield is shifted to the point B in order to shift the axis of the beam into alignment with the driver's eye point 7'. The virtual lens is thus moved to the position 3'-B to allow the entire image to be seen from the eye point 7'.

In the example shown in FIG. 1, the mirror angle need be adjusted approximately 5° to shift the point of reflection from the front windshield from the point A to the point B.

The preferred size of the display image at the point 5 would be approximately 40 mm×90 mm.

Figure 2:
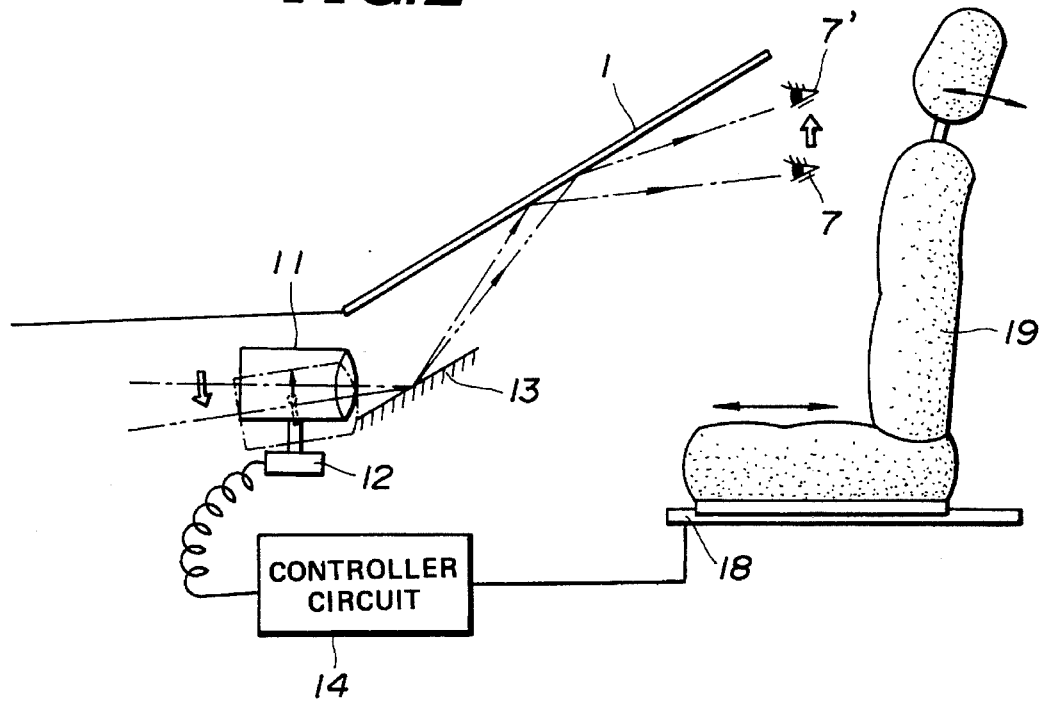
FIG. 2 is a fragmentary illustration showing the second embodiment of a heads-up type display system according to the invention.

FIG. 2 shows the second embodiment of the heads-up display system for the vehicle, according to the invention. In this embodiment, the point of reflection of the image beam is adjusted automatically depending upon the driving position.

It should be noted that the term "driving position" used in the disclosure means both the seat slide position and the inclination of the seat back. The term "driving position" may also include other seat adjustment factors, such as seat height, thigh support angle and so forth.

In order to adjust the image position of the heads-up type display system according to driving position, there is provided an optical system 11 which includes an image-forming light source, a lens and associated apparatus. The optical system 11 opposes the total reflection mirror 13 which is fixed to the instrument panel and is not angularly adjustable.

Although it is of course possible to manually adjust the optical axis of the image beam through the image position selector switch of FIG. 1, it is also possible to automatically control the light axis angle by actuating the optical system 11 in accordance with the driver's eye point.

Figure 3:
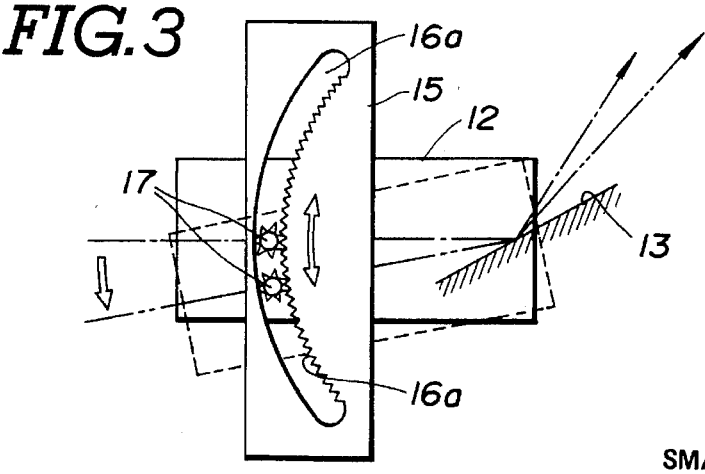
FIG. 3 is an enlarged view of the major part of the second embodiment of the display system of FIG. 2.

For the purpose of automatic control, the optical system 11 is associated with an angle adjusting motor 12. As shown in FIG. 3, the optical system 11 is mounted on the instrument panel by means of a stay 15. The stay 15 has an arcuate opening 16a with one elongaged side inner periphery formed with rack gear teeth 16b. The rack gear teeth 16b engage a pinion gear 17 driven by the angle adjusting motor 12. On the other hand, the angle adjusting motor 12 is connected to a controller circuit 14 which controls the motor's drive direction and period so as to adjust the angle of the image beam with respect to the plane of the total reflection mirror 13.

A driving position sensor means 18 monitors the driving position of the vehicular seat 19 selected by the driver. In cases where the seat 19 is equipped with an electrical seat position adjusting system, the control signals for the seat position adjusting system may be used as the optical axis adjustment parameter. The parameters used to control the optical axis include at least data indicative of the seat slide position and the seat back inclination.

Figure 4:
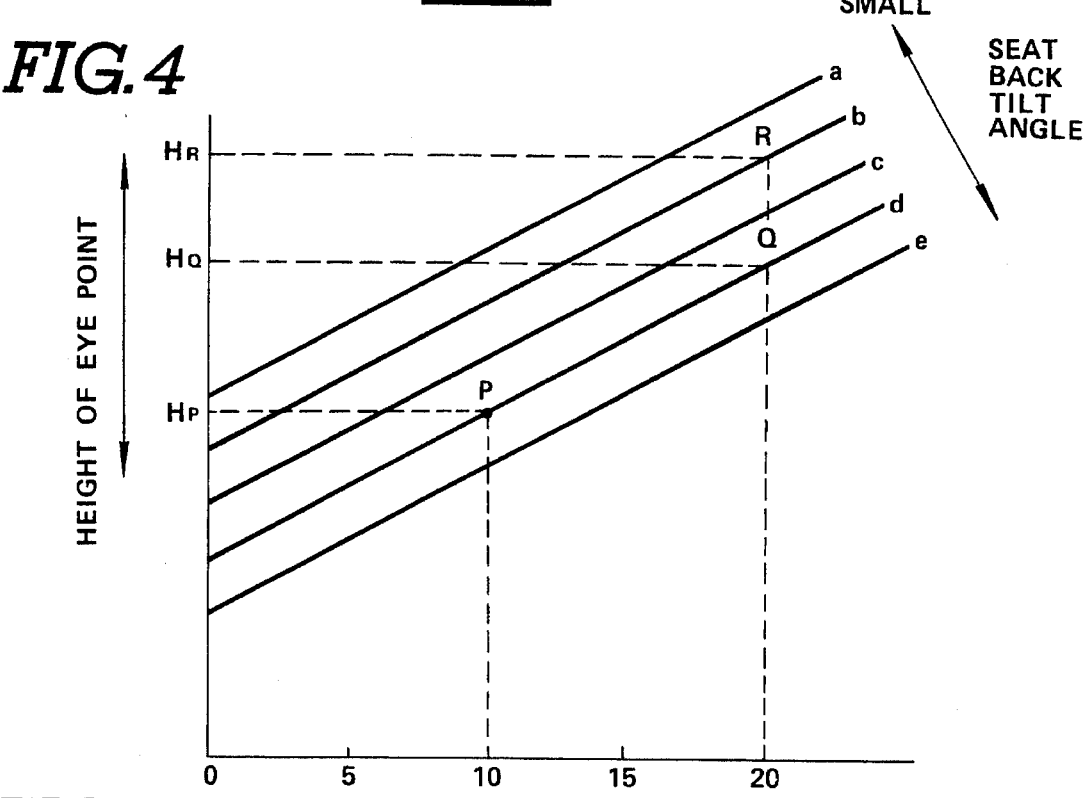
FIG. 4 is a graph of the relationships among seat position, height of eye point and seat back inclination.

FIG. 4 shows the relationship between the driving position, including the seat slide position and the seat back inclination, and the eye point. Assuming the driving position is selected so that the slider is 10 cm from its front end position and seat inclination is d in FIG. 4, the eye point will be $H_p$. From this initial position, if the seat slide is shifted rearward another 10 cm, the eye point will shift to $H_Q$ as will be appreciated from FIG. 4. Furthermore, if the seat back inclination is adjusted from the angle d to an angle b, the eye point will be $H_R$. The eye point value $H_n$ is determined by the seat slide position and the seat back inclination. The controller circuit 14 derives a control signal specifying the optical axis angle from the eye point value $H_n$ for use in controlling the optical system 11.

Figure 5:
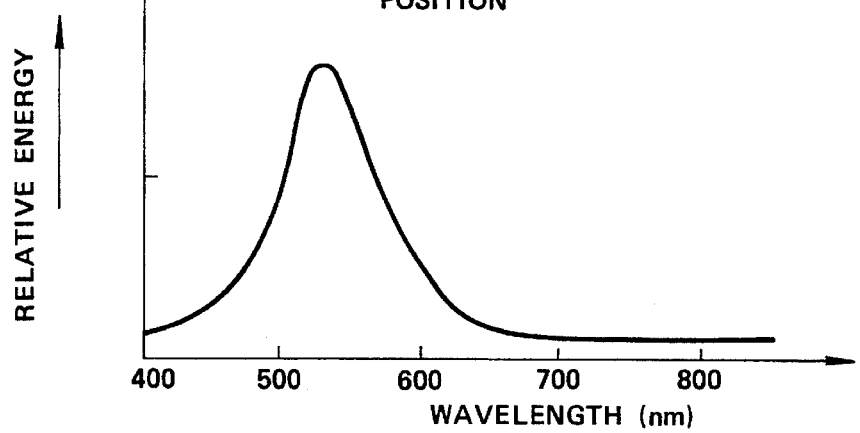
FIG. 5 is a graph of the spectral characteristics of the display light source and a reflector means.

In addition, by selecting spectral characteristics of the image source and the reflector which accord with the characteristics shown in FIG. 5, sunlight incident on the reflector 12 will not influence the displayed image on the front windshield. Specifically, the spectral characteristics of the image source and the reflector shown in FIG. 5 ensure that sunlight shining on the mirror will be absorbed by the mirror rather than reflected. This prevents the image displayed on the front windshield from fading, and thus ensures a clear display image under all conditions.

FIGS. 6 to 9 show the third and preferred embodiment of the heads-up type display system according to the invention. As will be appreciated herefrom, the heads-up type display system of this embodiment comprises a projector assembly formed as a single unit. The projector assembly employs a fluorescent display tube unit 104 serving as the image source. The fluorescent display tube unit 104 is housed in a display tube holder 104a of essentially cylindrical shape. The holder 104a has an axial, smaller-diameter cylindrical section 104b. The cylindrical section 104b is connected to one end of a cylindrical lens holder 103a in which a lens unit 103 is housed. The lens holder 103a is fixed to the vehicle body member, such as the instrument panel, by means of stays 103b.

The other end of the lens holder 103a is firmly connected to an essentially cylindrical extension 102b of a mirror holder 102a. The mirror holder 102a houses a concave mirror 102. The open end of the mirror holder 102a opposes the front windshield of the vehicle so that the image-forming light reflected by the concave mirror 102 is directed toward the inner surface of the front windshield.

Figure 8:
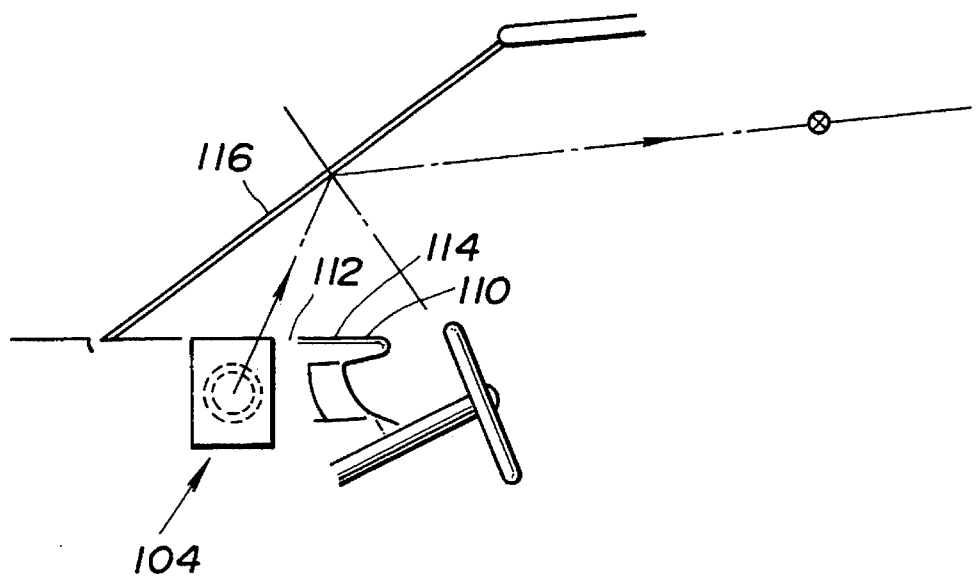
FIGS. 8 and 9 are explanatory side elevation and plan view showing practical manner of arranging a projector assembly consituting the third embodiment of FIGS. 6 and 7, within the vehicle.
Figure 9:
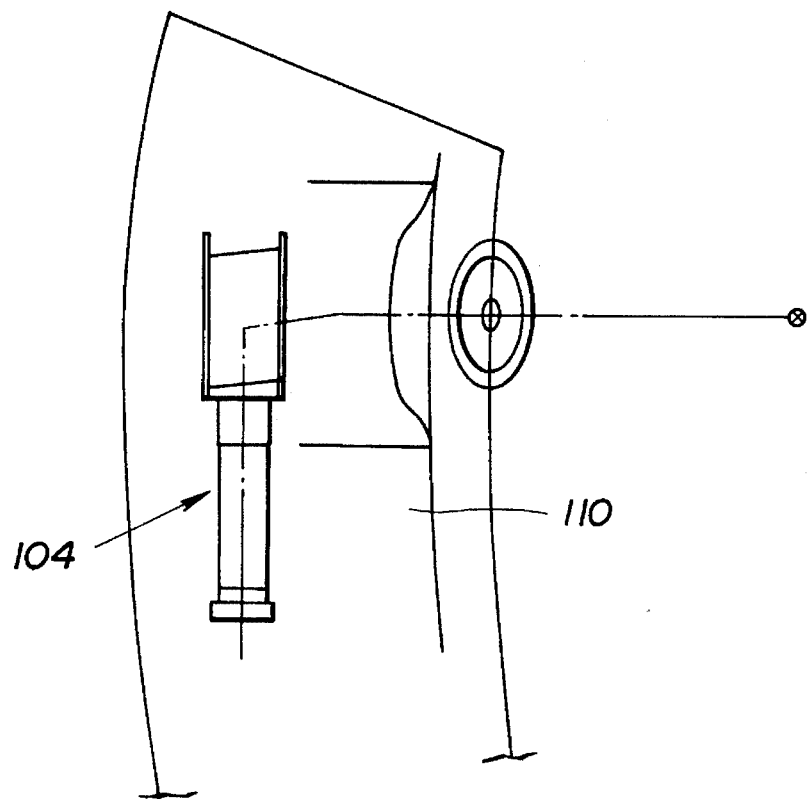

As shown in FIGS. 8 and 9, the projector assembly thus constructed is mounted within an instrument panel 110 with lying its longitudinal axis transversly. The angle of the mirror 102 is thus adjusted to direct the optical axis passing through an opening 112 formed through the upper essentially horizontal section 114 of the instrument panel and reflected by the windshield 116 extends on the vertical plane extending through a center of the steering wheel.

As will be appreciated, either the concave mirror 102 or the lens unit 103 may be remotely controlled to adjust the angle of the image beam relative to the front windshield so as to adjust the focal point of the image to be displayed.

According to the present invention, which has been disclosed hereabove in terms of the various embodiments, a clear display image will appear on the front windshield for various driver heights and seat positions by allowing remote and/or manual control of the area of the front windshield on which the display image is focused.

Therefore, the present invention fulfills all of the objects and advantages sought therefor.

While the present invention has been disclosed in terms of the specific embodiments, the invention can be implemented in various heads-up type display system configurations. Therefore, the present invention should be understood to include all possible embodiments and modifications of the shown embodiments which can be embodied without departing from the invention set out in the appended claims.

What is claimed is:

1. A display system for an automotive vehicle comprising:
   a front windshield positioned in front of a driver of a vehicle;
   a projector assembly installed in the vehicle, the projector assembly comprising an optical system for generating an image-forming light beam and a deflecting means for deflecting the light beam from the optical system toward the front windshield, the deflected image-forming light beam being further deflected on the front windshield toward the driver so as to form a display virtual image in front of the windshield, wherein the optical system and the deflecting means have the same spectral characteristics so that sunlight incident on the deflecting means through the front windshield is not reflected;
   a display position adjusting means, associated with the optical system, for changing the angle of the optical system, thereby to change an angle of incidence of the image-forming light beam on the deflecting means, the display position adjusting means including a motor for tilting the optical system with respect to the deflecting means; and
   a controller for driving the motor of the display position adjusting means to vary an inclination of an optical axis of the optical system with respect to the deflecting means, to allow an entire portion of the display virtual image in front of the front windshield to be visible to the driver when the driver's eye point changes.

2. The display system as set forth in claim 1, wherein said display image source means includes a lens for focusing the image-forming light beam on a virtual focal plane in front of said front windshield.

3. The display assembly as set forth in claim 2, wherein said display position adjusting means actuates said lens so as to adjust an inclination of an optical axis of said display image source means.

4. The display system as set forth in claim 1, wherein said controller includes memory means for storing image beam orientation data corresponding to a position of the driver's eye point and wherein said controller automatically adjusts said display position adjusting means to adjust the direction of said image-forming light beam deflected by said front windshield, in accordance with said data.

5. The display system according to claim 4 wherein the image beam orientation data is stored in accordance with the driving position of the driver.

6. The display system according to claim 5, further comprising a driving position sensor means for producing a signal corresponding to driver position that is sent to said controller.

7. The display system according to claim 6 wherein said driving position sensor means is responsive to signals from an electrical seat position adjusting means.

8. The display system according to claim 4, wherein the image beam orientation data is stored in accordance with a seat slide position.

9. The display system according to claim 4, wherein the image beam orientation data is stored in accordance with a seat back position.

10. The display system according to claim 4, wherein the image beam orientation data is stored in accordance with a seat height position.

11. The display system according to claim 4 wherein said memory means stores image beam orientation data corresponding to various drivers.

12. The display system according to claim 1, wherein said display position adjusting means further comprises an image position selector.

13. The display system as set forth in claim 1, wherein the spectral characteristics are represented by a plot of relative energy versus wavelength.

14. The display system as set forth in claim 1, wherein the optical system comprises an image source and an expansion lens for enlarging the image from the image source.

15. The display system as set forth in claim 1, wherein the deflecting means is not angularly adjustable.

16. The display system as set forth in claim 1, wherein the projector assembly is a single unit projector assembly comprising a display image source generating an image-forming light beam, a lens, and a mirror for deflecting the light beam from the display image source toward the inside of the front windshield, the image source, lens and mirror being mounted along a common axis.

17. The display system as set forth in claim 16, wherein the projector assembly is mounted inside an instrument panel of the vehicle with the common axis being positioned transversely in the dashboard.

18. The display system as set forth in claim 17, wherein the mirror deflects the light beam from the display image source toward the inside of the front windshield through an opening in an upper, horizontal surface of the instrument panel.

19. A display system for an automotive vehicle consisting essentially of:

a front windshield positioned in front of a driver of a vehicle;

a projector assembly installed in the vehicle, the projector assembly comprising an optical system for generating an image-forming light beam and a deflecting means for deflecting the light beam from the optical system toward the front windshield, the deflected image-forming light beam being further deflected on the front windshield toward the driver so as to form a display virtual image in front of the windshield, wherein the deflecting means has a spectral characteristic such that sunlight incident on the deflecting means through the front windshield is absorbed by the deflecting means and is not reflected;

a display position adjusting means, associated with the optical system, for changing the angle of the optical system thereby to change an angle of incidence of the image-forming light beam on the front windshield, the display position adjusting means including a motor for tilting the optical system with respect to the deflecting means; and a controller for driving the motor of the display position adjusting means to vary an inclination of an optical axis of the optical system with respect to the deflecting means, to allow an entire portion of the display virtual image in front of the front windshield to be visible to the driver when the driver's eye point changes.

20. The display system as set forth in claim 19, wherein the optical system includes a lens for focusing the image-forming light beam on a virtual focal plane in front of the front windshield.

21. The display assembly as set forth in claim 20, wherein the display position adjusting means actuates the lens so as to adjust an inclination of an optical axis of the optical system.

22. The display system as set forth in claim 19, wherein the controller includes memory means for storing image beam orientation data corresponding to a position of the driver's eye point and wherein the controller automatically adjusts the display position adjusting means to adjust the direction of said image-forming light beam deflected by the front windshield, in accordance with the data.

23. A display system for an automotive vehicle comprising:

a front windshield positioned in front of a driver of a vehicle;

a projector assembly installed in the vehicle, the projector assembly comprising an optical system for generating an image-forming light beam and a deflecting means for deflecting the light beam from the optical system toward the front windshield, the deflected image-forming light beam being further deflected on the front windshield toward the driver so as to form a display virtual image in front of the windshield, wherein the image-forming light beam from the optical system and the deflected image-forming light beam from the deflecting means have the same spectral characteristics so that sunlight incident on the deflecting means through the front windshield is not reflected; and a display position adjusting means, associated with the optical system, for changing the angle of the optical system, thereby to change an angle of incidence of the image-forming light beam on the front windshield, the display position adjusting means including a motor for tilting the optical system with respect to the deflecting means.

\* \* \* \* \*